United States Patent [19]
Tanaka

[11] Patent Number: 5,431,981
[45] Date of Patent: Jul. 11, 1995

[54] RESIN U-CHANNEL ASSEMBLY

[75] Inventor: Toshiharu Tanaka, Mie, Japan

[73] Assignee: Sumitomo Wiring Systems, Ltd., Yokkaichi, Japan

[21] Appl. No.: 59,356

[22] Filed: May 11, 1993

[30] Foreign Application Priority Data

Jun. 23, 1992 [JP] Japan .................. 4-049800 U

[51] Int. Cl.⁶ .............................................. B32B 1/04
[52] U.S. Cl. ...................................... 428/122; 428/358
[58] Field of Search ................................ 428/122, 358

[56] References Cited

U.S. PATENT DOCUMENTS

| | | | |
|---|---|---|---|
| 1,842,586 | 1/1932 | Davidson | 428/122 |
| 2,564,386 | 8/1951 | Webb | 428/122 X |
| 4,391,303 | 7/1983 | Holgersson | 428/52 X |
| 4,953,735 | 9/1990 | Tisbo et al. | 428/122 X |

FOREIGN PATENT DOCUMENTS

| | | |
|---|---|---|
| 2204745 | 11/1988 | United Kingdom . |
| 2205005 | 11/1988 | United Kingdom . |
| 2241385 | 8/1991 | United Kingdom . |
| 2258092 | 1/1993 | United Kingdom . |
| 8002476 | 11/1980 | WIPO . |

OTHER PUBLICATIONS

"Injection Molding", p. 174, Section a and FIG. 4.62, Published May 18, 1961.

Primary Examiner—Henry F. Epstein
Attorney, Agent, or Firm—Sughrue, Mion, Zinn, Macpeak & Seas

[57] ABSTRACT

A resin U-channel assembly 1 in a formed protector 10 for a wire harness wherein side plate portions 3 are prevented from bending inwardly in the assembly 1. The resin U-channel assembly 1 includes a bottom plate portion 2, side plate portions 3, and corner portions 5 integrally and vertically coupling the side plate portions 3 to the opposite side ends of the bottom plate portion 2. The corner portions 5 are thinner than the bottom plate portion 2 and the side plate portions 3 and extend in a longitudinal direction of the assembly 1.

6 Claims, 3 Drawing Sheets

RESIN U-CHANNEL ASSEMBLY

BACKGROUND OF THE INVENTION

1. Field of the Invention

This invention relates to a resin U-channel assembly in a formed protector for a wire harness, which receives a plurality of wires to adjust and maintain the shape of the wire harness.

2. Statement of the Prior Art

A resin U-channel assembly in a formed protector for a wire harness (hereinafter referred to as "a formed protector") has a U-shaped cross section with a uniform thickness, in which side plate portions are integrally and vertically connected to the opposite side ends of a bottom plate. The resin U-channel assembly is mass-produced by pouring a molten resin into a forming metal mold having a cavity with the same shape as the U-channel assembly.

The above U-channel assembly mass-produced by the metal mold is characterized in that a contraction coefficient becomes high due to progressive crystallization as the molten resin is slowly cooled and the contraction coefficient becomes low due to cessation of crystallization as the molten resin is quickly cooled, in accordance with the relationship between a temperature of the molten resin to be poured into the cavity and a temperature of the metal mold. Accordingly, the U-channel assembly with a uniform thickness has a high contraction coefficient, since the corners connecting the bottom plate portion and the side plate portions are slowly cooled. Stress due to the high contraction coefficient causes the side plate portions to be bent inwardly.

Since the U-channel assembly in the formed protector is bent inwardly and thus narrows at the opening, a step of inserting the wires into the assembly becomes difficult and a space for receiving the wires becomes small. Further, a cover is fitted on the formed protector with some play, thereby preventing the cover from being locked.

SUMMARY OF THE INVENTION

An object of the present invention is to provide a resin U-channel assembly in a formed protector for a wire harness wherein side plate portions are prevented from bending inwardly in the assembly and the function of the assembly is improved.

In order to achieve the above object, the resin U-channel assembly in accordance with the present invention, includes a bottom plate portion, side plate portions, and corner portions integrally and vertically coupling said side plate portions to .the opposite side ends of said bottom plate portion. The corner portions are thinner than said bottom plate portion and said side plate portions and extend along a longitudinal direction of said assembly.

The thickness of said corner portions becomes the same as that of said side plate portions and said bottom plate portion at the end thereof, or the same as that of said side plate portions and said bottom plate portion at the intermediate position thereof, or the same as that of said side plate portions and said bottom plate portion by making an inner diameter $R_1$ of said corner portions smaller than an outer diameter $R_2$ of said corner portions, or the same as that of said side plate portions and said bottom plate portion through a shoulder.

The reduction in thickness of said corner portions may be 30 to 70% of that of said bottom plate portion or said side plate portions.

The reduction in thin connecting corner portions do not have to be completely continued from a front end of the U-channel assembly to a rear end thereof. For example, the corner portions may be disconnected at a rib for reinforcing the assembly or a portion for coupling a branched channel assembly to the U-channel assembly. The thin connecting corner portions may be formed into an L-shaped cross section which has a small width near a contact position of the bottom and side plate portions.

Since the resin U-channel assembly of the present invention has thin connecting corner portions provided near the contact position of the bottom and side plate portions, the corner portions cool faster due to their thinner thickness such that the bottom and side plate portions are cooled when the molten resin is poured into the metal mold. This makes the rate of crystallization and the contraction coefficient low. That is, since the thin connecting corner portions are quickly cooled by the bottom and side plate portions, crystallization does not progress in the corner portions and the contraction coefficient of the corner portions is smaller than that of the bottom and side plate portions. Consequently, any stress caused in the corner portions by contraction becomes low and inward deformation of the side plate portions can be greatly suppressed.

DETAILED DESCRIPTION OF THE PREFERRED EMBODIMENTS

Figure 1:
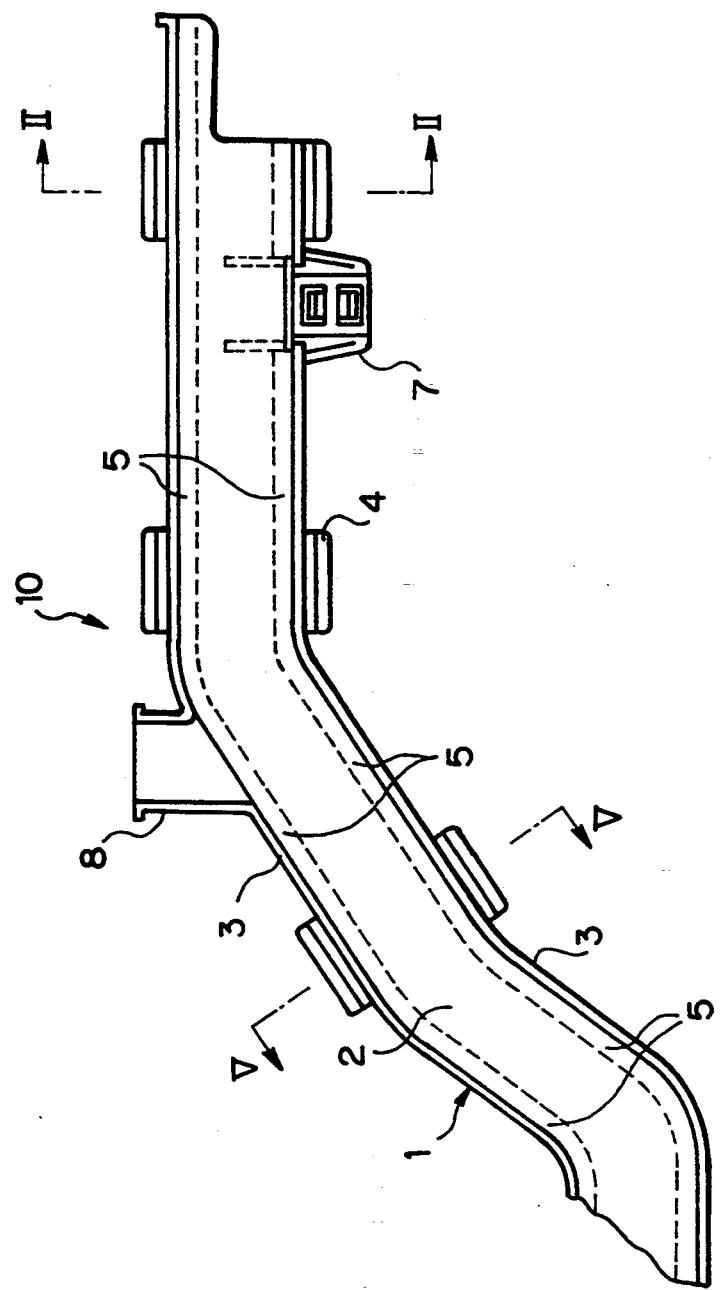
FIG. 1 is a plan view of a formed protector for a wire harness provided with a resin U-channel assembly in accordance with the present invention.
Figure 2:
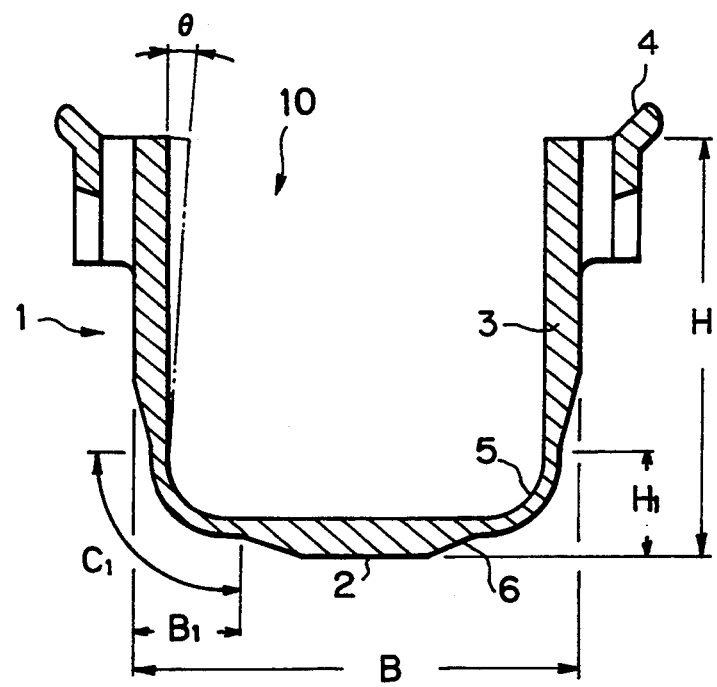
FIG. 2 is a cross sectional view taken along lines II—II in FIG. 1.
Figure 3:
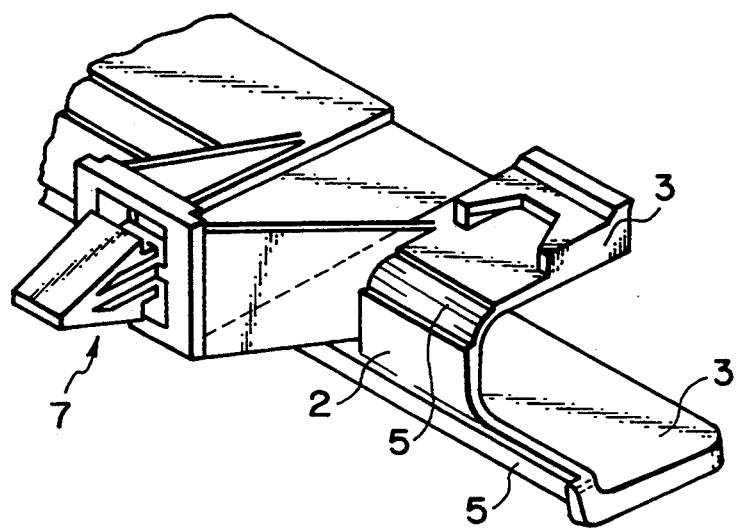
FIG. 3 is a partially enlarged perspective view of a clamp portion shown in FIG. 3.

Referring now to FIGS. 1 through 3, an embodiment of a resin U-channel assembly 1 of the present invention which is applied to a formed protector 10 for a wire harness is explained below. The resin U-channel assembly 1 in the formed protector 10 includes a bottom plate portion 2, side plate portions 3, and thin connecting corner portions 5. Each thin connecting portion 5 extends along a longitudinal direction of the U-channel assembly and couples each side plate portion 3 to each of the opposite side ends of the bottom plate portion 2.

The formed protector 10 is provided with a latch portion 4 for a cover (not shown), a clamp portion 7 (FIG. 3) which secures the protector 10 to a predetermined position of a vehicle, and a branched portion 8 which branches the wire harness.

As shown in FIG. 2, the thin connecting corner portions 5 have transient portions 6 between the opposite ends of the corner portions 5 and the ends of the bottom and side plate portions 2 and 3. The corner portions 5 have in a direction of the bottom portion 2 a length $B_1$ corresponding to about 20% of a channel width (outer channel width) of the U-channel assembly, and in a direction of the side plate portions 3 a height $H_1$ corresponding to about 16% of a channel height H (outer channel height). The corner portions 5 are formed into a circular arc coupling the bottom and side plate portions 2 and 3 and extend along a longitudinal direction of the U-channel assembly which turns in two or three-axis directions.

The reduction in thickness of the thin connecting corner portions 5 is 30–70% of that of the bottom and side plate portions 2 and 3. If the reduction in thickness is less than 30%, the opening of the channel assembly becomes closed so that wiring work can not be carried out, especially when the height H of the U-channel assembly is large even if an inclination angle $\theta$ of the side plate portions 3 is about 3°. If the reduction in thickness is over 70%, the strength of the corner portions 5 is so low that the portions 5 may break.

In the embodiment shown in FIG. 2, the thickness of the corner portions 5 gradually becomes the same as that of the side plate portions 3 and bottom plate portion 2 at the end thereof. Then, a thin thickness section has substantially a circular arc length $C_1$.

Figure 4A:
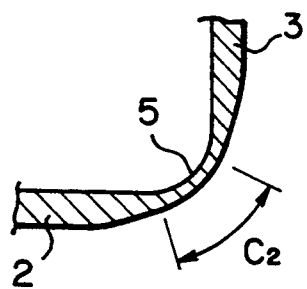
FIGS. 4A and 4B are partial cross sectional views illustrating other embodiments of thin connecting corner portions.
Figure 4B:
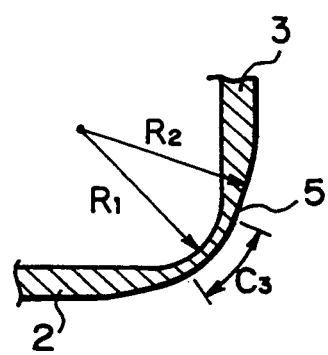

However, as shown in FIG. 4A, the thickness of the corner portions 5 may gradually become the same as that of the bottom and side plate portions 2 and 3 at the intermediate position thereof by using a tangent line. Then, a thin thickness section has substantially a circular arc length $C_2$. Also, as shown in FIG. 4B, the thickness of the corner portions 5 may gradually become the same as that of the bottom and side plate portions 2 and 3 by making an inner diameter $R_1$ of the corner portions 5 smaller than an outer diameter $R_2$ of the corner portions 5. Then, a thin thickness section has substantially a circular arc length $C_3$.

Figure 5:
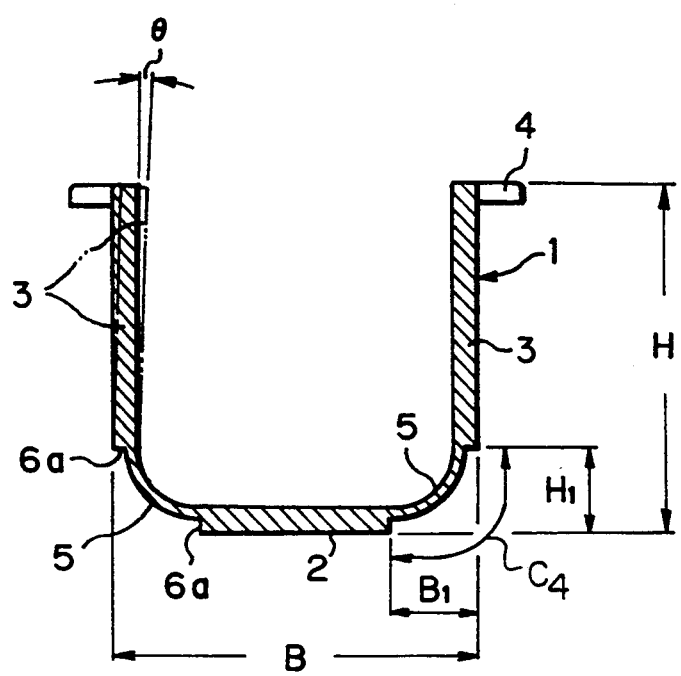
FIG. 5 is a cross sectional view taken along lines V—V in FIG. 1 illustrating still another embodiment of a thin connecting corner portion.

Further, as shown in FIG. 5, the thickness of the thin corner portions 5 may abruptly change to the thickness of the bottom and side plate portions 2 and 3 through a shoulder $6a$. Then, a thin thickness section has substantially a circular arc length $C_4$.

In summary, the relationship of the lengths of the thin thickness sections are as follows: $C_3 < C_2 < C_1 < C_4$.

The above embodiments of the U-channel assembly have the functions described above. In comparison with a conventional U-channel assembly having a uniform thickness at the bottom and side plate portions and the corner portions, the U-channel assembly of the present invention, having the same size of the conventional U-channel assembly, can keep a substantially normal U-channel shape in which an inclination angle $\theta$ of the side plate portions 3 relative to the bottom plate portion 2 is decreased from 5° in the prior art to about 1°. Consequently, it is possible to overcome the problems in wire-harnessing and cover-attaching in the prior art.

It will be apparent from the foregoing that the resin U-channel assembly of the present invention can cancel or suppress the inward deformation of the side plate portions during forming by the metal mold and keep a substantially normal U-channel shape and that the problems of inward deformation of the side plate portions in the prior U-channel assembly in the formed protector for the wire harness are eliminated and the function of the U-channel assembly can be readily and positively effected.

What is claimed is:

1. A resin U-channel assembly, for receiving a plurality of wires of a wire harness, including: a bottom plate portion having opposite side ends, opposing side plate portions, and corner portions integrally coupling said side plate portions to the opposite side ends of said bottom plate portion such that said side plate portions are vertically disposed with respect to said bottom plate portion;

said resin U-channel assembly having a smooth interior surface and having an exterior surface which varies at said corner portions so as to reduce a wall thickness of said resin U-channel assembly at said corner portions, said corner portions being thinner than said bottom plate portion and said side plate portions and extending in a longitudinal direction of said assembly, thereby substantially preventing said side plate portions from bending inwardly toward each other and obstructing insertion of the wires into said assembly.

2. A resin U-channel assembly according to claim 1, wherein a thickness of said corner portions is 30 to 70% less than that of said bottom plate portion or said side plate portions.

3. A resin U-channel assembly according to claim 1 wherein the thickness of said corner portions becomes the same as that of said side plate portions and said bottom plate portion at the ends thereof.

4. A resin U-channel assembly according to claim 1, wherein the thickness of said corner portions gradually becomes the same as that of said side plate portions and said bottom plate portion from its intermediate position to the ends thereof.

5. A resin U-channel assembly according to claim 1, wherein the thickness of the outer surface of said corner portions gradually becomes the same as that of said side plate portions and said bottom plate portion by making an inner diameter $R_1$ of said corner portions smaller than an outer diameter $R_2$ of said corner portions.

6. A resin U-channel assembly according to claim 1, wherein an abrupt transition in thickness occurs via a shoulder between said corner portions and said side plate portions, as well as between said corner portions and said bottom plate portion.

* * * * *